H. BUTTENBERG & J. L. STRONG.
Improvement in Stalk-Pullers.
No. 114,526
Patented May 9, 1871.
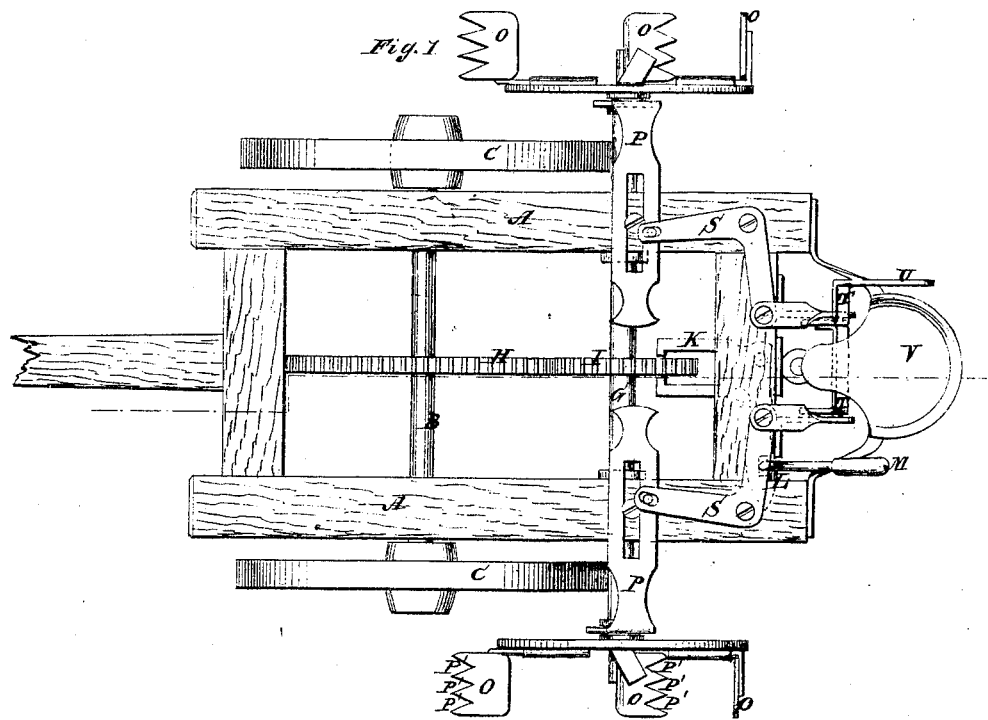
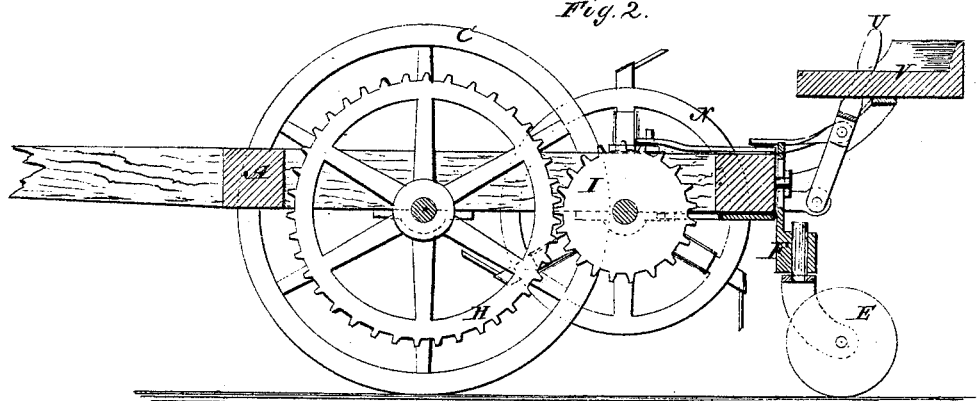
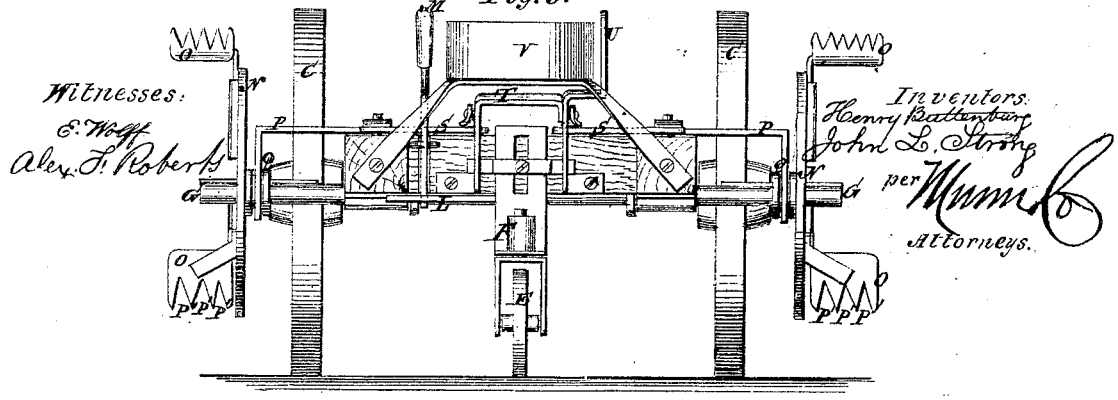

United States Patent Office.

HENRY BUTTENBERG AND JOHN L. STRONG, OF MEMPHIS, TENNESSEE.

Letters Patent No. 114,526, dated May 9, 1871; antedated May 2, 1871.

IMPROVEMENT IN STALK-PULLERS.

The Schedule referred to in these Letters Patent and making part of the same.

*To all whom it may concern:*

Be it known that we, HENRY BUTTENBERG and JOHN L. STRONG, of Memphis, in the county of Shelby and State of Tennessee, have invented a new and improved Stalk-Puller and Cutter; and we do hereby declare that the following is a full, clear, and exact description thereof, which will enable others skilled in the art to make and use the same, reference being had to the accompanying drawing forming part of this specification.

This invention relates to improvements in machines for pulling and cutting cotton and other stalks; and consists in a pair of rotary wheels carrying grab-hooks or pulleys mounted on a truck, when used as a puller, sharp blades being substituted for the grab-hooks when used as a cutter, and operated by gearing connected with the axle of the driving-wheels, which grabbing and pulling or cutting-wheels are arranged for being shifted laterally on their shaft while in motion, all as hereinafter described.

Figure 1 is a plan view of our improved machine;
Figure 2 is a longitudinal sectional elevation; and
Figure 3 is an end elevation.

Similar letters of reference indicate corresponding parts.

A is an ordinary wood frame mounted on the axle B of two wheels, C, and provided with a tongue for hitching animals to it.

The said frame extends rearward some distance beyond the rear of the wheels C, and has a caster-wheel, E, the stock F of which is attached to the rear so as to be adjusted vertically as may be required.

G is a shaft mounted on the frame A, behind the wheels C, parallel with the axle, and projecting at each end beyond the frame.

It is turned by means of a driving-wheel, H, on the axle B and a pinion, I, on it gearing together.

The pinion is capable of sliding on the shaft G, and works in the crotch K of a bell-crank, L, shown in dotted lines in fig. 1, to which a lever, M, is jointed, for shifting the said wheel into and out of gear with the wheel H.

N represents wheel-rims, or it may be any other suitable support for radial arms, carrying grabbing and pulling or cutting instruments O, the former resembling rakes or combs to some extent, the latter having a like resemblance to a pruning-hook or knife; the first adapted for catching the stalks near the roots in the notches P', pulling them up, and carrying them over and delivering them at the rear of the machine as it moves along the ground; the second for cutting the stalks near the roots, the said grabbers or cutters turning in the direction opposite to that of the wheels C.

The stalk-pulling or cutting instruments are designed to be so placed on the shaft G as to be capable of adjustment to or from each other to some extent, according to the variations in the distances between the rows, so that they may each be caused to act on a row at once.

For so shifting them the sliding bars P having the elbows Q through which the hubs of the wheels work, are arranged on the frame A in suitable guides for sliding out and in parallel with the shaft G, and the bell-crank S connected to the vibrators T are connected to them.

The said vibrators have a handle, U, by which the attendant may work them while sitting on the seat V.

Having thus described our invention,

We claim as new and desire to secure by Letters Patent—

1. The rotary stalk-grabbing and pulling and cutting instruments O, mounted on the shaft G of a truck gearing with the axle thereof, all combined and arranged substantially as specified.

2. The stalk-grabbing and pulling and cutting instruments O mounted on the shaft G, so as to be adjusted thereon to or from each other, substantially as specified.

3. The combination, with the grabbing and pulling and cutting-wheels N, of the sliding plates P Q, the elbow-levers S, vibrators P, and the hand-lever U, all substantially as specified.

H. BUTTENBERG.
JOHN L. STRONG.

Witnesses:
WM. DICKSON,
W. F. BELL.